United States Patent Office 2,698,736
Patented Jan. 4, 1955

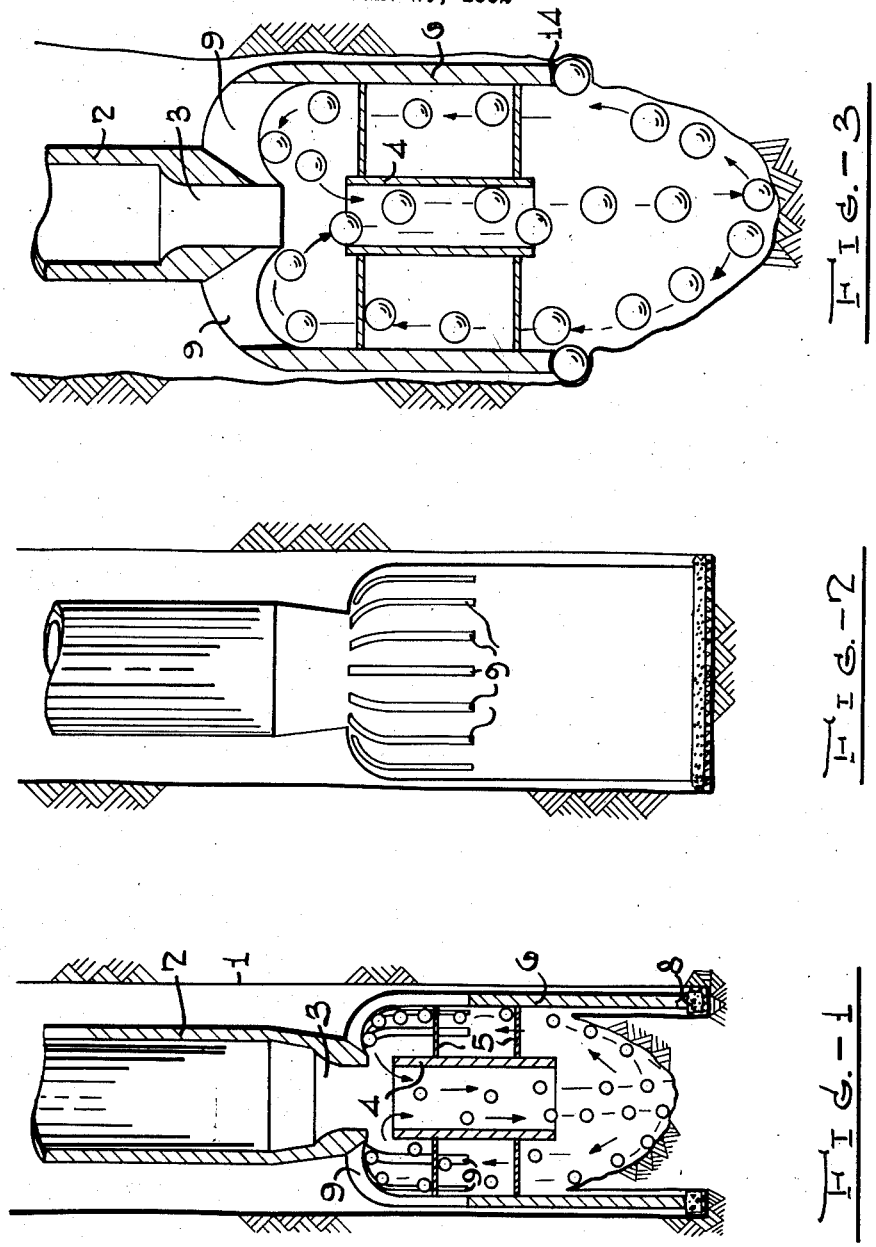

2,698,736

COMBINATION PELLET IMPACT DRILL AND ANNULUS CUTTING DRILL

Leroy W. Ledgerwood, Jr., and Frank G. Boucher, Tulsa, Okla., assignors to Standard Oil Development Company, a corporation of Delaware Application January 29, 1952, Serial No. 268,884

3 Claims. (Cl. 255—61)

This invention concerns a novel form of drilling apparatus particularly adapted for the drilling of oil wells. The drill of this invention employs a dual drilling action. A sleeve shaped member having cutting edges is employed as a rotary drill in one phase of the drilling to cut an annulus at the bottom of the bore hole. In conjunction therewith a multitude of dense spherical pellets are entrained in a high velocity fluid jet and are impinged on the bottom of the bore hole within the volume defined by the annular cutting tool referred to.

It has recently become appreciated that rapid, effective drilling can be achieved by entraining a plurality of pellets in a high velocity fluid jet. The flow energy of the high velocity fluid jet is transmitted to the solid spherical pellets entrained therein. These pellets traveling with the high kinetic energy thereby achieved exert an effective percussion or shattering action when caused to impinge on an earth formation to be drilled.

This type of pellet impact drilling is by its nature particularly effective in drilling the central portion of a bore hole. When employing a single fluid jet containing entrained pellets, the cutting pattern achieved is of the nature of a paraboloid of revolution. To secure the greatest efficiency in the operation of such a drilling procedure the diameter of the hole achieved is to some extent limited. Consequently, it becomes desirable to supplement this basic drilling technique with other drilling methods best adapted to cut an annular channel.

The present invention comprises a combination drilling technique to provide this objective. One portion of a drill apparatus comprises a core barrel type cutter adapted to cut an annular channel in the earth formation to be drilled. The second portion of the drilling apparatus comprises a suitable jet nozzle assembly with means to permit continuous recirculation and entrainment of drilling pellets in the fluid jet provided to drill the central portion of the bore hole.

The pellets to be employed in the pellet impact drilling employed in this invention must satisfy certain critical requirements. First the pellets must be substantially spherical in shape, having a smooth non-abrasive surface. The spherical shape has been found to be important to secure a useful pellet life since sharp projections of the pellets employed would cause rapid fracturing of the pellets and excessive wear of the drill apparatus. Again spherical pellets are best adapted to withstand the multitudinous forceful impacts to which the pellets are exposed during drilling. Secondly, it is required that the pellets have a substantial size in excess of at least 1/8" in diameter. In this connection it has been established that the drilling action achieved is proportional to the size of pellets so that the maximum sized pellets are to be employed, consistent with limitations as to the nozzle size permissible in the apparatus and the fracturing characteristics of the pellets, Practically, this requires use of pellets having a diameter less than about 1". Preferably pellets are employed having a diameter of about 0.5 to 1 inch. Thirdly, it is necessary that the pellets have the highest practical density. The kinetic energy obtained by the pellets under the acceleration of a fluid jet in large part controls the drilling rates obtainable. Consequently, the higher the density of the pellets, the greater the kinetic energy obtainable and the greater the drilling rate.

The pellets may thus constitute metallic spheres having the indicated diameter. Ball bearings, the surfaces of which have not been hardened, are exemplary of the type of pellets which may be employed. Other ferrous alloys are particularly contemplated for use. Non-brittle tungsten carbide alloys may be employed. Alternatively tungsten carbide alloys or other heavy metals may be used as to form a heavy core surfaced by tough ferrous alloys.

The fluid to be employed to form the necessary high velocity fluid jet may be chosen from a wide range of gases or liquids. Many of the considerations governing selection of the drilling mud in conventional drilling procedures do not apply to the selection of a drilling fluid for use in this invention. Thus it becomes practical, particularly for shallow hole drilling, to employ air or another gas as the fluid. Water or fluids of the nature ordinarily employed as drilling muds may be used if desired. In this connection it has been found that the lighter the drilling fluid, with respect to pellets of a fixed density, the greater the drilling rate. Consequently it is preferred to employ low density fluids consistent with other requirements of the fluid.

With this basic understanding of the principles controlling pellet impact drilling, the present invention can be understood by reference to the accompanying drawings in which:

Figure 1 diagrammatically illustrates in cross-sectional detail a drill apparatus of preferred form embodying the invention;

Figure 2 illustrates the drill of Figure 1 in an elevational view to clearly indicate the slotted nature of the shroud employed as a cutting barrel;

Finally, Figure 3 illustrates an alternative form of the invention in which a shot drilling effect is employed on the lower edge of a sleeve to cut an annular channel.

Referring first to Figures 1 and 2, the drill of this invention is illustrated in cutting position in a bore hole 1. The entire drill apparatus is fixed to and supported by a tubular member 2 which may be of the nature of a conventional drill string as employed in rotary drilling operations. While not illustrated, the drill of this invention is fixed to the drill string in any desired manner as by means of a threaded coupling. The lower portion of the drill string, or the upper portion of the drill itself, comprises a restricted tubular channel forming a nozzle 3. In the description which follows the nozzle 3 will be identified as the primary jet nozzle. It is a function of this primary jet nozzle to convert pumping pressure applied to fluid passing through the drill pipe 2 into velocity flow energy. In other words, the primary nozzle is employed to form a constricted high velocity jet of drilling fluid as the fluid is pumped downwardly through the drill string.

Suspended immediately below and concentric with the primary nozzle 3 is a sleeve element 4 defining what may be identified as a secondary nozzle. This nozzle may be fixed below the primary nozzle in any suitable fashion as, for example, by means of webs 5 extending from the secondary nozzle to the shroud element to be described. It is a function of this secondary nozzle to provide an entraining and accelerating nozzle channel wherein pellets to be ejected are accelerated by the jet of fluid from the primary nozzle. The secondary nozzle must have a substantially greater diameter than the primary nozzle in order to accommodate the jet of fluid in combination with the volume occupied by the entrained pellets.

Dependent from the nozzle assembly or the tubular support 2 is a bell-shaped shroud element 6, which is in essence a core barrel. This core barrel is characterized by a downwardly dependent sleeve portion extending for some distance below the secondary jet nozzle 4. In accordance with this invention, the lower edge of the sleeve of the core barrel is provided with cutting surfaces. For example, abrasive particles 8 may be embedded in the edge of the core barrel. Alternatively cutting teeth of the general nature employed in rock cutting may be positioned along the lower edge of the core barrel. Consequently on rotation of drill string 2, the core barrel is caused to cut an annular channel so as to form a central core of earth formation. Concommittently with this coring-cutting action, pellet impact drilling is conducted in the central portion of the apparatus within the core barrel. For this purpose a multitude of pellets having the character indicated are disposed within the walls of the core barrel. On ejection of fluid through the primary and secondary nozzles the pellets are caused to circulate in the following manner: Fluid jetted through the primary nozzle and into the secondary nozzle entrains and accelerates pellets in the secondary nozzle so as to forcefully eject the pellets against the central portion of the bore hole. These pellets are then carried outwardly and upwardly by the flow of fluid in the general pattern illustrated, cutting a drilling pattern of the nature shown. Circulated upwardly in this manner, the pellets contact the inside surface of the bell shaped core barrel and are rolled along this surface so as to be reintroduced to the secondary nozzle along the curved surface provided on the inner surface of the core barrel. Slots 9 extending around the upper periphery of the core barrel permit passage of drilling mud and pulverized earth upwardly to the surface of the earth in the conventional manner, but are of such restricted size as to prevent escape of pellets. A pellet impact drill of this general nature employing a slotted shroud to prevent escape of pellets is disclosed and claimed in co-pending application Serial No. 268,882 of Leroy W. Ledgerwood, Jr., filed January 29, 1952.

The primary and secondary nozzles of the apparatus described are so designed in conjunction with the pellets and drilling fluid employed so as to secure an impact drilling action cutting a hole somewhat smaller in diameter than the core barrel employed. Consequently the cutting action of the core barrel, coupled with the impact drilling action referred to, serves to provide an effective and rapid drilling action employing the best features of each of these drilling techniques.

A desirable modification of the invention is illustrated in Figure 3. It will be observed that the apparatus of Figure 3 essentially corresponds to that of Figure 1 and Figure 2. However, in Figure 3 the core barrel preferably does not extend as far below the secondary nozzle 4. The reason for this requirement will become apparent. The lower edge of the sleeve 6 of the core barrel in this embodiment of the invention is shaped to provide a concave channel 14 extending around the lowermost edge. This portion of the sleeve is preferably hardened so as to provide a long wearing surface. Beneath this concave runway of the sleeve, a multitude of pellets of the character employed in the pellet impact drilling described are lodged. Consequently on rotation of a drill bit these pellets, trapped under the concave edge of the core barrel, serve to cause a shot drilling action cutting an annular channel. At the same time, pellet impact drilling of the character defined is relied upon to cut the central portion of the bore hole within the limits of the core barrel. It may be observed that pellets can be brought beneath the edge of the core barrel in the manner described by raising the core barrel somewhat off bottom during circulation of the pellets. On then lowering the core barrel to bear on the bottom a suitable number of pellets will be trapped as described to provide the necessary shot drilling action. Alternatively, by raising the drill off bottom and stopping fluid circulation, the pellets will settle beneath the core barrel which is then lowered on the pellets.

Again, therefore, the apparatus of Figure 3 like the apparatus of Figure 1, serves to combine a core cutting operation with a central pellet impact cutting action so as to provide an effective drilling technique.

What is claimed is:

1. An apparatus for drilling bore holes in the earth comprising a tubular support member attachable to a drill pipe, a jet nozzle element fixed to the lower termination of the support member in fluid communication therewith, an outwardly flaring shroud element fixed to and surrounding the lower termination of said nozzle element, a second nozzle element supported within said shroud element below and in substantially axial alignment with said first nozzle element, said shroud element terminating in a dependent skirt portion having means on its bottom edge adapted to cut an annular channel in an earth formation upon rotation of said tubular support member, said shroud element having open perforations adjacent its juncture with said first nozzle element.

2. Apparatus as defined by claim 1 in which said means adapted to cut an annular channel comprises an annular groove cut into the lower edge of said skirt portion whereby to provide a raceway to receive spherical pellets.

3. Apparatus as defined by claim 1 in which said means adapted to cut an annular channel comprises abrasive particles embedded in the lower edge of said sleeve portion.

References Cited in the file of this patent

UNITED STATES PATENTS

| Number | Name | Date |
|---|---|---|
| 994,866 | Muhleisen | June 13, 1911 |
| 1,193,468 | Okell | Aug. 1, 1916 |
| 1,512,841 | Gamble | Oct. 21, 1924 |
| 1,628,033 | Davis | May 10, 1927 |
| 1,642,572 | Acker | Sept. 13, 1927 |
| 2,072,627 | Zublin | Mar. 2, 1937 |
| 2,233,260 | Hawthorne | Feb. 25, 1941 |
| 2,329,393 | Davis | Sept. 14, 1943 |